July 7, 1953

N. H. LEHRER 2,644,903

SELF-STARTING ELECTROSTATIC GENERATOR

Filed Sept. 25, 1952

NORMAN H. LEHRER
INVENTOR.

BY Ralph E. Bitner

ATTORNEY

Patented July 7, 1953

2,644,903

UNITED STATES PATENT OFFICE 2,644,903

SELF-STARTING ELECTROSTATIC GENERATOR

Norman H. Lehrer, Bloomfield, N. J., assignor to Chatham Electronics Corporation, Newark, N. J.

Application September 25, 1952, Serial No. 311,360

5 Claims. (Cl. 310—6)

The subject matter of this patent may be used by or for the Government for governmental purposes without the payment of any royalties to me.

This invention relates to influence type electrostatic generators, specifically those employing feedback, and has particular reference to an arrangement of components which provides reliable starting action and which always starts with the same polarity.

Prior art generators of the induction type are not self-starting and a separate source is generally used to apply a charge to one of the induction plates to start the generator. The separate source can be a friction generator, a battery, or any other source of direct current power.

The present machine is an improvement over prior art machines in that it provides reliable starting action with the desired polarity without requiring additional parts. Reversal of polarity caused by polarization of a dielectric covering the stator plates is prevented by leaving the stator plates uncovered.

One of the objects of the present invention is to provide an improved electrostatic generator which avoids one or more of the disadvantages and limitations of prior art generators.

Another object of the invention is to provide an electrostatic influence generator which always starts its generating action without separate excitation.

Another object of the invention is to provide an electrostatic generator which always starts with the same polarity.

Another object of the invention is to reduce the cost and complexity of self-starting generators by using only the parts generally employed in generators that are not self-starting.

The invention comprises an electrostatic generator which includes a disk shaped rotor containing a number of conducting sectors imbedded in the rotor insulating material. Brush contact with the conducting sectors is made at the edge of the rotor disk where small portions of the sectors project. One of the collecting brushes is made of molybdenum or similar material and, in addition to making contact with the sector portions, rubs against the edge of the insulator disk, causing a charge to be generated due to frictional phenomena. The usual set of stator influence plates is mounted close to the disk surface for inducing a charge in the rotating sectors. One of the stator plates is separated from the disk surface a greater distance than the other plates. One set of brushes is connected to a diametral conductor which isolates charges on the sectors as they pass through the field of the stator plates. Another set of brushes, connected to the stator plates, keeps the plates charged and produces the voltage for the load circuit.

For a better understanding of the present invention, together with other and further objects thereof, reference is made to the following description taken in connection with the accompanying drawings.

Referring now to the figures, a rotor 10 is made of non-conducting material such as Lucite and is mounted for rotation on a central shaft 11. This shaft may be turned by any convenient means, by hand, or by an electric motor. Imbedded in the body of rotor 10 are a number of conducting sectors 12, formed in a wedge-shaped outline with a small tab portion 13 which extends to the periphery of the disk to make contact with a brush or collector electrode.

Figure 1:
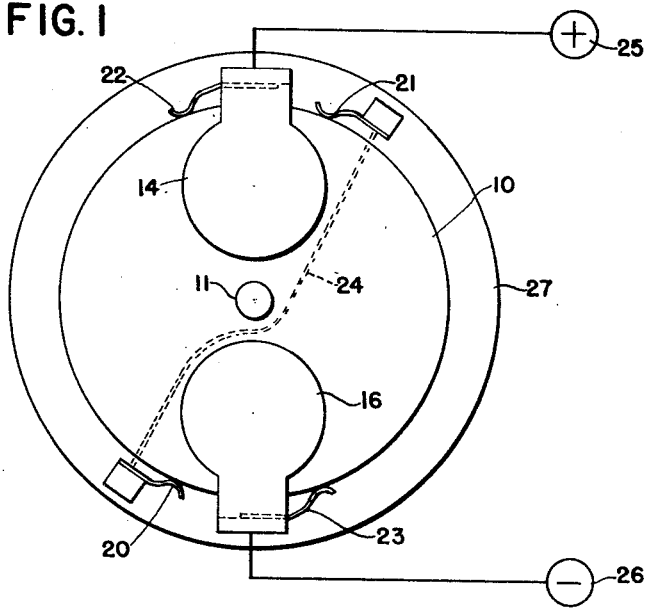
Fig. 1 is a plan view of an electrostatic influence generator shown partly in schematic representation.
Figure 2:
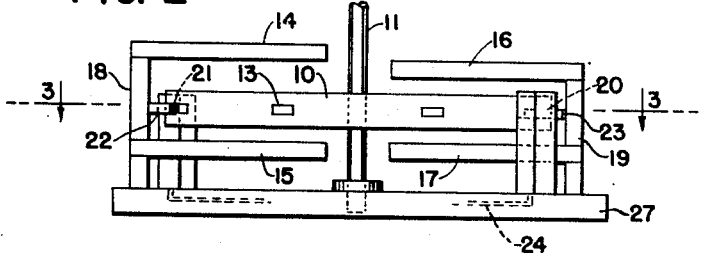
Fig. 2 is a side view of the generator showing the arrangement of the brushes.
Figure 3:
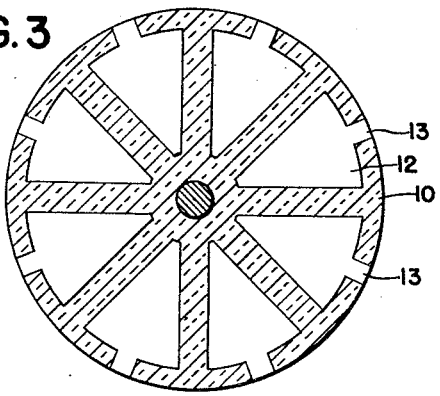
Fig. 3 is a cross sectional view of the rotor taken along line 3—3 of Fig. 2.

The conducting sectors 12 may be positioned in the rotor body as indicated in Fig. 3, in a single plane, or they may be mounted in a dual plane arrangement in overlapping positions in order to increase the current output.

In order to induce an electric charge on the sectors, four induction stator plates 14, 15, 16, and 17 are mounted in the positions shown, close to the rotor face. These plates are insulated from the rotor only by an air gap. Plate 14 is mounted a greater distance from the rotor face than the other plates. The stator plates are secured by conductive brackets 18 and 19 which also serve as supports for two of the brushes which make contact with the rotor edge.

Four brushes 20, 21, 22, and 23 are mounted around the periphery of the disk to make contact with the sector tabs as they revolve. Two of these brushes 20 and 21 are connected by the well known diametral conductor which is generally a component of all electrostatic induction generators and which segregates the charges on the sectors as they pass through the electric field of the stator plates.

Brushes 22 and 23 are connected to stator plates 14, 15 and 16, 17 respectively. They collect part of the charge of the rotating sectors to maintain the stator plates at maximum potential.

One of the diametral brushes 20 is made of molybdenum and is mounted a little out of line so that part of the brush rubs on the edge of the rotor insulation. This rubbing action generates sufficient frictional charge to start the machine. Any one of the brushes 20, 21, 22, and 23 can be positioned so as to function as a brush and also to generate the frictional electric charge needed to start the machine. Also a separate brush can be added to generate this charge if desired.

Two terminals 25 and 26 are provided for connecting to a load circuit. These terminals are connected to the stator plate combinations 14, 15 and 16, 17. An insulating base 27 acts as a support for all the components including the rotor shaft 11. Either terminal may be grounded.

The operation of the generator is as follows: at the start let it be assumed that all parts of the machine are at zero potential and no accumulated charge exists on any of the plates or sectors. Power is applied to the rotor and as it revolves the rubbing of brush 20 along the surface of the rotor insulator generates an electrical charge, some of which resides at the upper edge of the rotor. This charge, which is positive in the case of molybdenum against Lucite, induces negative charges on both stator plates 14 and 16. Since plate 16 is closer to the charged surface on which the positive charge resides it has a negative charge of higher voltage induced on its lower surface than the negative charge on the lower surface of plate 14. When the rotating sectors are brought within the range of influence of these stator plates, the sectors under plate 16 are charged with a greater positive potential than the sectors under plate 14 and when the diametral conductor 24 makes and breaks the connection between the sectors, the sector under plate 14 is charged negatively and the sector under 16 is charged positively.

When the sectors move away from the stator plates, their potential increases as the capacity decreases in accordance with the well known law which states that the quantity of electricity is equal to the product of the capacity and the potential. When the sectors arrive at the opposite plate their charge is collected by one of the brushes 22 or 23 and the stator plates are charged to a higher potential. This cumulative process continues until leakage or a load limits the potential to a maximum value.

The potential of an isolated conductor in an electric field is proportional to the work done upon it to move it from one portion of the field to another. Moving the sectors from an oppositely charged plate such as 16 increases the potential in proportion to the decrease in capacity and in a similar manner, moving the sectors toward a similarly charged plate such as 14 also increases the potential in proportion to the increase in capacity.

The above is believed to be a correct explanation of the principles underlying applicant's invention. However, further investigation may lead to a modification of this theory. It is to be understood that the invention is independent of any theory that may be advanced to account for the results obtained.

While there have been described and illustrated specific embodiments of the invention, it will be obvious that various changes and modifications may be made therein without departing from the field of the invention which should be limited only by the scope of the appended claims.

I claim:

1. A self-starting electrostatic influence generator comprising; a rotor made of insulating material; a plurality of conducting sectors imbedded in the rotor material, each having a connection to the surface of said rotor; a pair of conducting stator plates mounted adjacent to the rotor, one of said plates mounted at a greater distance from the rotor than the other; a diametral conductor connecting brushes on opposite sides of the rotor, said brushes mounted to make contact with said sector connections as the sectors pass through the electric field of the stator plates; a pair of collector brushes, each connected to a stator plate and mounted to make contact with said sector connections as the sectors pass into the electric field of the stator plates; and a brush mounted so as to rub on the rotor insulating material.

2. A self-starting electrostatic influence generator comprising; a rotor made of insulating material mounted for rotation on a shaft; a plurality of conducting sectors imbedded in the rotor material, each having a connection to the surface of said rotor; a pair of conducting stator plates mounted adjacent to the rotor, one of said plates mounted at a greater distance from the rotor than the other; a diametral conductor connecting brushes on the opposite sides of the rotor, said brushes mounted to make contact with said sector connections as the sectors pass through the electric field of the stator plates; a pair of collector brushes, each connected to a stator plate and mounted to make contact with said sector connections as the sectors pass into the electric field of the stator plates; one of said brushes mounted so as to rub on the rotor insulating material.

3. A self-starting electrostatic influence generator comprising; a rotor disk made of insulating material mounted for rotation on a shaft; a plurality of conducting sectors imbedded in the rotor material equally spaced and insulated from each other, each of said sectors having a connection to the surface of said rotor; a pair of conducting stator plates mounted adjacent to the rotor, one of said plates mounted at a greater distance from the rotor than the other; a diametral conductor connecting brushes on the opposite sides of the rotor disk, said brushes mounted to make contact with said sector connections as the sectors pass through the electric field of the stator plates; a pair of collector brushes, each connected to a stator plate and mounted to make contact with said sector connections as the sectors pass into the electric field of the stator plates; one of said brushes mounted so as to rub on the rotor insulating material and generate frictional charges thereon.

4. A self-starting electrostatic influence generator comprising; a rotor disk made of insulating material and mounted for rotation about an axis normal to the disk faces; a plurality of flat conducting sectors imbedded in the rotor material, insulated from each other and parallel to the disk faces; each of said sectors having a connection to the periphery of the rotor; a pair of conducting stator plates mounted parallel to the rotor faces, one of said plates mounted at a greater distance from the rotor face than the other; a diametral conductor, terminated by brushes on opposite sides of the rotor disk, said brushes mounted so as to make contact with the sector connections as the sectors pass through the electric field of the stator plates; a pair of collector brushes, each connected to a stator plate and mounted so as to make contact with said sector connections as the sectors pass into the electric field of the stator plates; one of said brushes mounted so as to rub on the rotor insulating material and generate frictional charges thereon.

5. A self-starting electrostatic influence generator comprising; a rotor disk made of insulating material and mounted for rotation about an axis normal to the disk faces; a plurality of flat conducting sectors imbedded in the rotor material, insulated from each other and parallel to the disk faces; each of said sectors having a connection to the periphery of the rotor where contact can be made with one or more stationary brushes; a pair of conducting stator plates mounted adjacent to the rotor faces and parallel thereto, one of said plates mounted at a greater distance from the rotor face than the other; a diametral conductor, terminated by brushes on opposite sides of the rotor disk, said brushes mounted so as to make contact with the sector connections as the sectors pass through the electric field of the stator plates; a pair of collector brushes, each connected to a stator plate and mounted so as to make contact with said sector connections as the sectors pass into the electric field of the stator plates; one of said diametral or collector brushes mounted so as to rub on the rotor insulating material as well as to make contact with the sector connections.

NORMAN H. LEHRER.

References Cited in the file of this patent

UNITED STATES PATENTS

| Number | Name | Date |
|---|---|---|
| 2,523,689 | Felici | Sept. 26, 1950 |
| 2,577,466 | Bosch | Dec. 4, 1951 |